May 1, 1973   A. W. MARTIN   3,730,801
RETREADING OF TYRES
Filed April 26, 1971
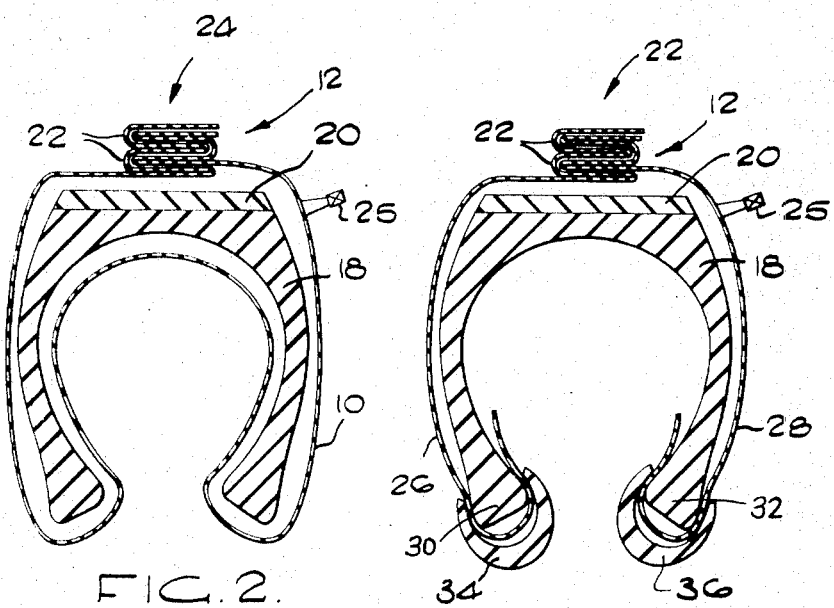
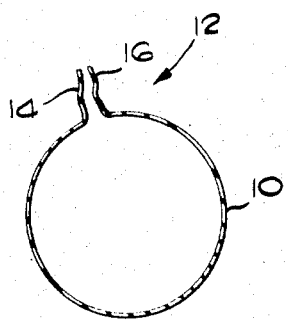
Inventor:
Aubrey Wilfred Martin
By
Karl W. Flocks
Attorney United States Patent Office 3,730,801
Patented May 1, 1973

3,730,801
RETREATING OF TYRES
Aubrey Wilfred Martin, Heilbron, Orange Free State, Republic of South Africa, assignor to Republic Rubber Industries Limited, Heilbron, Orange Free State, Republic of South Africa
Filed Apr. 26, 1971, Ser. No. 137,195
Claims priority, application Republic of South Africa, Nov. 6, 1970, 70/7,541
Int. Cl. B29h 5/04, 17/36
U.S. Cl. 156—96                    2 Claims

ABSTRACT OF THE DISCLOSURE

The invention provides for a method of and means for the retreading of tyres. In accordance with the invention, a tyre is retreaded by enclosing the tyre in a flexible envelope which is peripherally slit. The envelope is sealed by interfolding the overlapping regions of the envelope a plurality of times within one another. By then providing a higher fluid pressure outside the envelope than inside it, the envelope is forced against the new tread which is thereby forced against the tyre casing.

BACKGROUND OF THE INVENTION

This invention relates to improvements in or relating to the retreading of tyres. The invention relates in particular to a method of and apparatus for the retreading of tyres.

SUMMARY OF THE INVENTION

According to the invention there is provided a method of retreading tyres including the steps of providing a peripherally slit flexible envelope around the external surface of a tyre casing so that the marginal regions of the envelope overlap one another along the tread region of the tyre casing, providing a fluid tight seal in the envelope along the tread region of the tyre casing by interfolding the marginal regions of the envelope a plurality of times within each other, and establishing a higher gas pressure outside the envelope than in the space between the envelope and the tyre casing.

Further according to the invention there is provided apparatus for the retreading of tyres including a peripherally slit flexible envelope to enclose at least the external surface of the tyre casing in which the tread is provided, the marginal regions of the envelope being adapted to be interfolded a plurality of times within one another to form a fluid tight seal along the tread region of the tyre casing.

The flexible envelope may comprise an endless tube in which a peripheral slit is provided. In this arrangement, the envelope when fitted around a tyre casing would require only one seal namely a peripheral seal along the tread region of the tyre casing.

In an alternative arrangement, the flexible envelope may be provided in two halves by making two peripheral slits in an endless tube, one slit along the inner periphery of the tube and the other slit along its outer periphery. In this arrangement, two or more seals would be required. One seal will be along the tread portion of the tyre casing and one or more seals along the interior surface of the tyre casing.

When one or more seals are provided in the flexible envelope along the interior surface of the tyre casing one seal could be in the same form as the seal along the tread region of the tyre casing i.e. by interfolding the marginal regions of the envelope a plurality of times within one another. Alternatively, the seals could be provided by clamping the inner marginal regions of the envelope halves to the beads of the tyre casing. Clamping may be effected by means of clamps of U-shaped cross-section of an elastic material such as rubber or a suitable synthetic plastic material.

The flexible envelope may conveniently be of an elastic material such as rubber or a suitable synthetic plastic material.

One or more one way valves may be provided in the flexible envelope to permit the establishment of a higher gas pressure outside the envelope than in the space between the envelope and the tyre casing.

The higher gas pressure outside the envelope may be established by evacuating the gas from the space between the envelope and the tyre casing. Alternatively, or in addition, the higher gas pressure outside the envelope may be established by creating super-atmospheric pressure outside the envelope.

The invention is now described with reference to the accompanying drawings, in which:

FIG. 1 shows a cross-sectional view of a tubular flexible envelope with a peripheral slit arranged so that the marginal regions overlap one another;

FIG. 2 shows a cross-sectional view of the flexible envelope of FIG. 1 in position over a tyre casing; and FIG. 3 shows a cross-sectional view of another form of flexible envelope in accordance with the invention in position over a tyre casing.

Referring to FIG. 1, reference numeral 10 indicates a flexible endless tube of an elastic material, such as rubber, slit peripherally at 12 so that the marginal regions 14 and 16 can overlap each other.

Referring to FIG. 2, the envelope 10 of FIG. 1 is shown in position around a tyre casing 18 to which a tread 20 is to be fitted. The envelope is so fitted that the peripheral slit 12 is located along the tread 20. By a plurality of interfolds or interdigitated folds 22 in the overlapping marginal regions 14 and 16, a fluid tight seal 24 is formed along the tread portion 20. The air may now be evacuated from the space between the envelope 10 and the tyre casing 18 and tread 20 via a one way valve 25, whereby the envelope 10 is forced against the tread 20, whereby the tread 20 is forced against the tyre casing 18.

Referring to FIG. 3, a seal 22 is shown which is formed in the same manner as the seal 24 in FIG. 2. The only difference between the envelope of FIG. 2 and the envelope of FIG. 3 is that the envelope of FIG. 3 is in two halves 26 and 28. The margins of the envelope halves 26 and 28 are folded over the tyre beads 30 and 32 and are clamped to the tyre beads by resilient clamps 34 and 36 to form fluid tight seals. The space between the envelope halves 26 and 28 and the tyre casing 18 and the tread 20 may now be evacuated so that the envelope will press against the tread 20 which will be forced against the tyre casing 18.

Before the tread 20 is positioned over the tread zone of the tyre 18, the tread zone is prepared in the conventional manner to receive the new tread. A bonding composition, such as a rubber compound, is applied to the prepared tread zone, whereafter the new tread 20 is fitted to the tread zone in the manner described above.

If desired, heat may be applied to facilitate curing of the bonding composition.

I claim:

1. A method of retreading tyres including the steps of providing a peripherally slit, flexible, elastic envelope around the external surface of a tyre casing, folding back one of the marginal regions of the flexible, elastic envelope onto itself and stretching the other marginal region over the folded-back marginal region so that the marginal regions of the flexible, elastic envelope overlap one another along the tread region of the tyre casing, providing a fluid tight seal in the envelope along the tread region of the tyre casing by interfolding in interdigitated relation, the overlapping marginal regions of the envelope a plurality of times within one another, and establishing a higher fluid pressure outside the envelope than in the space between the envelope and the tyre casing so that the folds become interlocking and self-sealing.

2. Apparatus for retreading types including a peripherally slit flexible elastic envelope to enclose at least the external surface of the tyre casing in which tread is provided, the marginal regions of the envelope being sufficiently flexible and elastic so that they be interfolded in interdigitated relationship a plurality of times within one another to form a fluid-tight seal along the tread region of the tyre casing, valve means in said envelope for evacuating air from the space between the envelope and the tyre casing, and separate elastic material as rubber of suitable plastic and of resilient clamp members of U-shaped cross-section to clamp inner edges of said envelope against each of the beads of the tyre casing.

References Cited

UNITED STATES PATENTS

| | | | |
|---|---|---|---|
| 2,966,936 | 1/1961 | Schelkmann | 156—96 |
| 3,207,647 | 9/1965 | Schelkmann | 156—394 |
| 2,976,910 | 3/1961 | Nowak | 156—96 |
| 3,236,709 | 2/1966 | Carver | 156—96 |

FOREIGN PATENTS

| | | | |
|---|---|---|---|
| 92,699 | 11/1959 | Netherlands | 156—96 |

ALFRED L. LEAVITT, Primary Examiner

C. B. COSBY, Assistant Examiner

U.S. Cl. X.R.

156—128, 394; 264—36, 314, 316; 425—17, 39, 43, 44

UNITED STATES PATENT OFFICE
CERTIFICATE OF CORRECTION

Patent No. 3,730,801      Dated May 1, 1973

Inventor(s) Aubrey Wilfred MARTIN

It is certified that error appears in the above-identified patent and that said Letters Patent are hereby corrected as shown below:

Column 1, line 2, the correct Title is

"RETREADING OF TYRES"

Signed and sealed this 12th day of November 1974.

(SEAL)
Attest:

McCOY M. GIBSON JR.
Attesting Officer

C. MARSHALL DANN
Commissioner of Patents